United States Patent [19]
Englesson et al.

[11] 3,861,690
[45] Jan. 21, 1975

[54] MECHANICAL SEAL DEVICE

[75] Inventors: Bertil Englesson, Bromma;
Karl-Ingvar Eriksson, Ekero; Willy Kallstrom, Spanga; Torvald Stahl, Alvsjo, all of Sweden

[73] Assignee: ITT Ind., Inc., New york City, N.Y.

[22] Filed: Feb. 8, 1972

[21] Appl. No.: 224,498

[30] Foreign Application Priority Data
Feb. 16, 1971 Sweden.............................. 1928/71

[52] U.S. Cl..................... 277/26, 277/81, 277/237, 415/112
[51] Int. Cl............................................. F16j 15/34
[58] Field of Search........... 277/26, 28, 32, 81, 237; 415/111, 112, 9, 174

[56] References Cited
UNITED STATES PATENTS
1,857,961   5/1932   Lamb.................................. 277/26
FOREIGN PATENTS OR APPLICATIONS
590,139   7/1947   Great Britain....................... 277/26
OTHER PUBLICATIONS
Chemical Synonyms Trade Names, by Garner and Cooke, The Technical Press Ltd., 1948.

*Primary Examiner*—William D. Martin, Jr.
*Assistant Examiner*—Robert I. Smith
*Attorney, Agent, or Firm*—John T. O'Halloran; Menotti J. Lombardi, Jr.; Vincent Ingrassia

[57] ABSTRACT

The invention relates to a mechanical seal device, especially for pumps, which seal is intended to prevent the pumped medium from passing into the pump motor. Such seals consist, among other things, of two seal rings, one stationary connected to the pump housing and one rotatable connected to the pump axis. The seal rings are pressed against each other by resilient means. Because of the friction between the two rings, there will be a generation of heat which is normally abducted by cooling oil or by the pumped medium. In case of break downs, for instance if the pumped medium disappears, the seal rings may be overheated. This is undesirable, especially in mine pumps where explosive gases may appear. According to the invention overheating is prevented by mounting a temperature-sensitive device, fuse metal, close to one of the seal rings. When the temperature has reached the critical value, the temperature-sensitive device will fuse, whereby the two seal rings are allowed to part and the generation heat ceases.

2 Claims, 3 Drawing Figures

PATENTED JAN 21 1975 3,861,690

MECHANICAL SEAL DEVICE

BACKGROUND OF THE INVENTION

This invention relates to mechanical seals, and more particularly to mechanical seals for use in pumps.

Seal devices include among other things one stationary and one rotatable seal ring. The former is then connected to a stationary detail, for instance a pump housing, while the latter is connected to a rotary detail, for instance a pump axis. The two seal rings are pressed against each other by means of one or more resilient members, for instance helical springs or plate springs.

Because of the strong friction, caused by the spring force, between the seal rings during the rotation and because of possible pressure of the sealed medium, there will be a generation of heat which may cause an overheating. In case of ordinary operating conditions this will be avoided by using balanced mechanical seals, double mechanical seals, with circulating cooling fluid therebetween, or seal rings with cooling ribs, which are cooled by the sealed medium. In case of break-downs, for instance if the sealed medium disappears or if the circulation of cooling fluid stops, the temperature in the seal rings may rise quickly. Some times, however, no part of a construction, in which the seal is built in, is allowed to have a temperature exceeding a predetermined value at any time. Examples of such constructions are pumps for mines where explosive gases or explosive dust may appear, and pumps for fluids which can easily be set on fire. In such constructions it is therefore necessary that the temperature in the seal never exceeds the allowed value, if, for instance, the sealed medium disappears.

SUMMARY OF THE INVENTION

It is an object of the present invention to provide a mechanical seal device which eliminates the risks of unacceptable overheating of the seal rings.

According to a broad aspect of the invention there is provided an improved mechanical seal device wherein there is provided a stationary and a rotatable seal ring which are pressed against each other by one or more resilient devices, wherein the improvement comprises temperature sensitive means for disengaging said stationary and rotatable seal rings at a particular temperature.

The above and other objects of the present invention will be better understood from the following detailed description taken in conjunction with the accompanying drawings in which:

DESCRIPTION OF THE PREFERRED EMBODIMENTS

Figure 1:
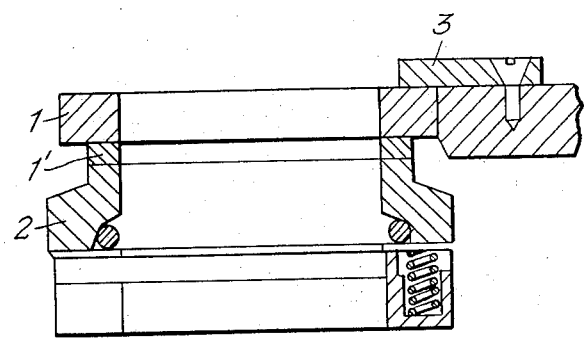
FIG. 1 shows a mechanical seal device with a washer made of fuse metal which supports one of the seal rings.

In FIG. 1, a seal device is disclosed, where a temperature sensitive member is designed as a washer 3 fixed in the stationary part of the construction, which washer makes a support surface for a stationary seal ring 1. Ring 1 comprises two sections; the main section of stainless steel, and the wearing part 1' of a hard metal. Washer 3 is made of a metal which fuses at a certain predetermined temperature (Wood's metal). Wood's metals are defined on page 551 of *Chemical Synonyms on Trade Names* as alloys of bismuth, tin and lead usually containing cadmium. Located below seal ring 1 is a rotatable seal ring 2, likewise made of a hard metal. When the temperature has reached the critical value the washer 3 will fuse and the seal ring 1 is allowed to move upwards, whereby the rings 1 and 2 loose their contact.

Figure 2:
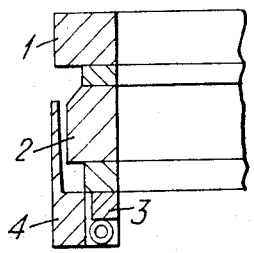
FIG. 2 shows a mechanical seal device, where one part of the seal housing is made of fuse metal.

In FIG. 2, temperature sensitive member is composed of a portion 3 of a seal housing which surrounds sealing ring 2. At the critical temperature, portion 3 fuses and seal ring 2 moves downward losing contact with upper seal ring 1.

Figure 3:
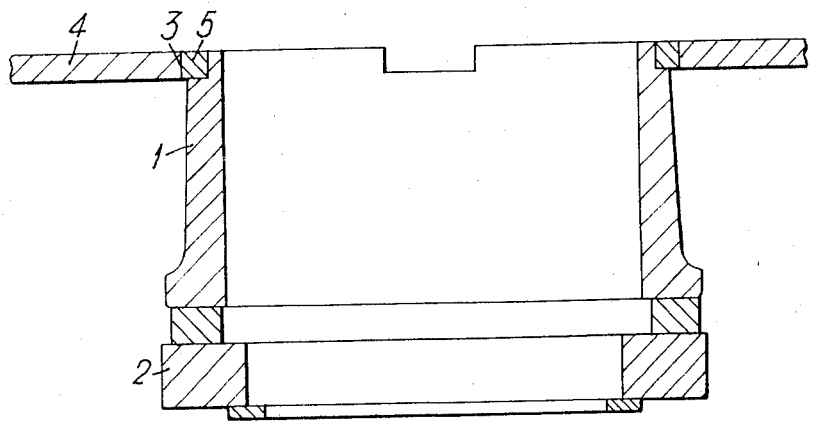
FIG. 3 shows a mechanical seal device, where a washer which supports one of the seal rings is assembled by a temperature-sensitive joint.

In FIG. 3, finally, the temperature-sensitive member is composed of a joint 3, which unites two parts 4 and 5 of a washer, which makes a support surface for the stationary seal ring 1. The joint may be a soldered seam, a glue line or a contraction joint. When the critical temperature is reached the joint will be released and the part 5 and the seal ring 1 are allowed to move upwards so that the contact between the seal rings 1 and 2 ceases.

It is to be understood that the foregoing description of specific examples of this invention is made by way of example only and is not to be considered as a limitation on its scope.

We claim:

1. An improved mechanical seal device wherein there is provided a stationary seal ring and a rotatable seal ring which are pressed against each other by one or more resilient devices, wherein the improvement comprises:
    means coupled to one of the seal rings for holding the same in contact with the other seal ring during normal operation of the seal, said means being made of a fuse metal which fuses at a critical temperature above the temperature of normal operation of the seal for disengaging said stationary and rotatable seal rings at said critical temperature.

2. An improved mechanical seal device according to claim 1 wherein said means consists of a washer coupled to one of the seal rings.

* * * * *